US011682936B2

(12) United States Patent
Ichigozaki et al.

(10) Patent No.: US 11,682,936 B2
(45) Date of Patent: Jun. 20, 2023

(54) MOTOR

(71) Applicant: TOYOTA JIDOSHA KABUSHIKI KAISHA, Toyota (JP)

(72) Inventors: Daisuke Ichigozaki, Toyota (JP); Kyoko Nakamura, Nagoya (JP); Masaaki Ito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 17/517,169

(22) Filed: Nov. 2, 2021

(65) Prior Publication Data

US 2022/0140675 A1    May 5, 2022

(30) Foreign Application Priority Data

Nov. 4, 2020 (JP) .............................. JP2020-184675

(51) Int. Cl.
*H02K 1/27* (2022.01)
*H02K 1/276* (2022.01)
*H02K 15/03* (2006.01)

(52) U.S. Cl.
CPC ............. *H02K 1/276* (2013.01); *H02K 15/03* (2013.01)

(58) Field of Classification Search
CPC ................................ H02K 1/276; H02K 15/03
See application file for complete search history.

(56) References Cited

U.S. PATENT DOCUMENTS

2007/0284960 A1* 12/2007 Fulton .................. H02K 1/2766
                                                    310/156.01
2018/0183289 A1*  6/2018 Horiuchi .................. H02K 1/24

FOREIGN PATENT DOCUMENTS

JP     2002-136009 A     5/2002
JP     2014-155242 A     8/2014

\* cited by examiner

*Primary Examiner* — Thomas Truong
(74) *Attorney, Agent, or Firm* — Oliff PLC (57) ABSTRACT

Provided is a motor capable of suppressing reduction of the torque of the motor even if the amount of use of the permanent magnets embedded in the rotor core is reduced. A motor includes a rotor with permanent magnets embedded in a rotor core, and a stator positioned on an outer circumference of the rotor. The rotor includes magnetic poles formed around a rotation axis of the rotor, the magnetic poles having the permanent magnets arranged therein. The permanent magnets in adjacent magnetic poles are arranged such that positions of a north pole and a south pole of the permanent magnet in one magnetic pole are inverted from those of the permanent magnet in a magnetic pole adjacent to the one magnetic pole. The permanent magnets each have a residual magnetization that decreases as it moves from the north pole toward the south pole.

4 Claims, 6 Drawing Sheets

MOTOR

CROSS REFERENCE TO RELATED APPLICATIONS

The present application claims priority from Japanese patent application JP 2020-184675 filed on Nov. 4, 2020, the entire content of which is hereby incorporated by reference into this application.

BACKGROUND

Technical Field

The present disclosure relates to a motor, and particularly to a motor including a rotor having permanent magnets embedded in a rotor core, and a stator positioned on the outer circumference of the rotor.

Background Art

As such type of motor, the one including a rotor having permanent magnets embedded in a rotor core made of a soft magnetic material, and a stator positioned on the outer circumference of the rotor has conventionally been proposed. Such a motor with the embedded permanent magnets is known as a high-efficiency motor using both reluctance torque and magnetic torque.

For example, JP 2002-136009 A discloses a rotor having magnets inserted into slots formed in a rotor core. In JP 2002-136009 A, it is proposed that the number of slots for inserting and holding magnets in the rotor core is set to at least double the typical number of magnetic poles, in order to increase the torque of a motor (see, for example, JP 2002-136009 A).

SUMMARY

In order to increase the torque of the motor by using a rotor of an interior permanent magnet type as disclosed in JP 2002-136009 A, the number of magnetic poles and the amount of permanent magnets used (i.e., magnet amount) may be increased. Increasing the number of magnetic poles can surely increase both the magnetic torque and the reluctance torque. However, increasing the number of magnetic poles of a current rotor is not practical because it makes the production of the rotor core complicated. Meanwhile, increasing the magnet amount of permanent magnets can increase the magnetic torque, but may increase the material cost of the rotor. In view of the above, decreasing the magnet amount of permanent magnets may lead to a lower magnetic torque of the motor, and thus it is difficult to maintain the torque performance of the motor.

The present disclosure has been made in view of the foregoing, and provides a motor capable of suppressing reduction of the torque of the motor even if the amount of use of the permanent magnets embedded in the rotor core is reduced.

In view of the foregoing, the motor according to the present disclosure includes a rotor with a plurality of permanent magnets embedded in a rotor core; and a stator positioned on an outer circumference of the rotor, in which: the rotor includes a plurality of magnetic poles formed around a rotation axis of the rotor, the magnetic poles having the permanent magnets arranged therein, the permanent magnets in adjacent magnetic poles are arranged such that positions of a north pole and a south pole of the permanent magnet in one magnetic pole are inverted from those of the permanent magnet in a magnetic pole adjacent to the one magnetic pole, and the permanent magnets each have a residual magnetization that decreases as it moves from the north pole toward the south pole.

In the motor with a rotor of an interior permanent magnet type, the torque of the motor can be expressed by the sum of a magnetic torque and a reluctance torque. Herein, the magnetic torque is proportional to the amount of permanent magnets used (i.e., magnet amount) in the rotor core, whereas the reluctance torque is proportional to the magnetic resistance of the magnets.

In the present disclosure, the residual magnetization of each permanent magnet decreases as it moves from the north pole toward the south pole. That is, in the portion of the permanent magnet, a large residual magnetization means that the density of magnetic flux flowing from the north pole is large and the density of magnetic flux returning to the south pole is also large, whereas a small residual magnetization means that the density of magnetic flux flowing from the north pole is small and the density of magnetic flux returning to the south pole is also small. Therefore, the expression "the residual magnetization of the permanent magnet decreases as it moves from the north pole toward the south pole" means that the residual magnetization of the outermost surface on the north pole is the largest in the magnet, and the residual magnetization of the outermost surface on the south pole is the smallest in the magnet. Therefore, the expression "the residual magnetization of the permanent magnet decreases as it moves from the north pole toward the south pole" means that the density of magnetic flux returning to the south pole of the permanent magnet is smaller than the density of magnetic flux flowing from the north pole of the permanent magnet. When such a permanent magnet is used, the magnetic torque is lower than that of the permanent magnet having a uniform residual magnetization by a decrease in the residual magnetization on the south pole. However, when the motor is driven, the magnetic flux flowing from the north pole is more likely to flow to the stator, thus increasing the reluctance torque of the motor.

In view of the above, even if the magnetic torque decreases by the use of a smaller amount of the permanent magnets embedded in the existing rotor, it is possible to increase the reluctance torque. Thus, it is possible to suppress reduction of the torque of the motor. As a result, it is possible to reduce the material cost of the motor while ensuring the performance of the motor. In addition, it is possible to increase the torque of the motor as compared to the existing motor when the amount of permanent magnets used is equal to that in the past.

Herein, the expression "the residual magnetization of the permanent magnet decreases as it moves from the north pole toward the south pole" means that the residual magnetization may decrease with inclination (i.e., linearly) or may decrease in stages. As long as the magnet has such magnetic properties, the magnet is not particularly limited, and the amount of rare-earth metal to be added may be adjusted or the volume density of the magnet may be adjusted. In some embodiments, the permanent magnet has a volume density that decreases as it moves from the north pole toward the south pole.

Herein, since the permanent magnet has a volume density that decreases as it moves from the north pole toward the south pole, such a permanent magnet can be obtained by using the same material. Therefore, it is possible to reduce the amount of magnets used as compared to that in the past by a decrease in volume density. In addition, since the permanent magnet can have a larger thickness when the magnet amount of permanent magnet is equal to that in the past, it is possible to increase the reluctance torque of the motor.

In addition, in some embodiments, the permanent magnet is obtained by stacking a plurality of magnetic layers from the north pole to the south pole, and the magnetic layer close to the north pole has a larger residual magnetization than that of the magnetic layer close to the south pole.

According to this embodiment, such a permanent magnet can easily be produced by stacking different types of magnet pieces, and variations in magnetic properties of the permanent magnets can be reduced. Furthermore, for example, the magnetic layer close to the south pole may be made of a ferrite magnet having a small residual magnetization, and the magnetic layer close to the north pole may be made of a rare-earth magnet having a large residual magnetization. In this manner, it is possible to reduce the cost of the permanent magnet as compared to the case of using only the rare-earth magnet. In addition, in the permanent magnet, the volume density of the magnetic layer close to the north pole may be larger than the volume density of the magnetic layer close to the south pole. In this case, the permanent magnet can easily be produced by stacking magnet pieces having different volume densities without changing the composition of the permanent magnet.

According to the present disclosure, it is possible to suppress reduction of the torque of the motor even if the amount of use of the permanent magnets embedded in the rotor is reduced.

DETAILED DESCRIPTION

An embodiment according to the present disclosure will be described with reference to FIG. 1 to FIG. 2B.

Figure 1:
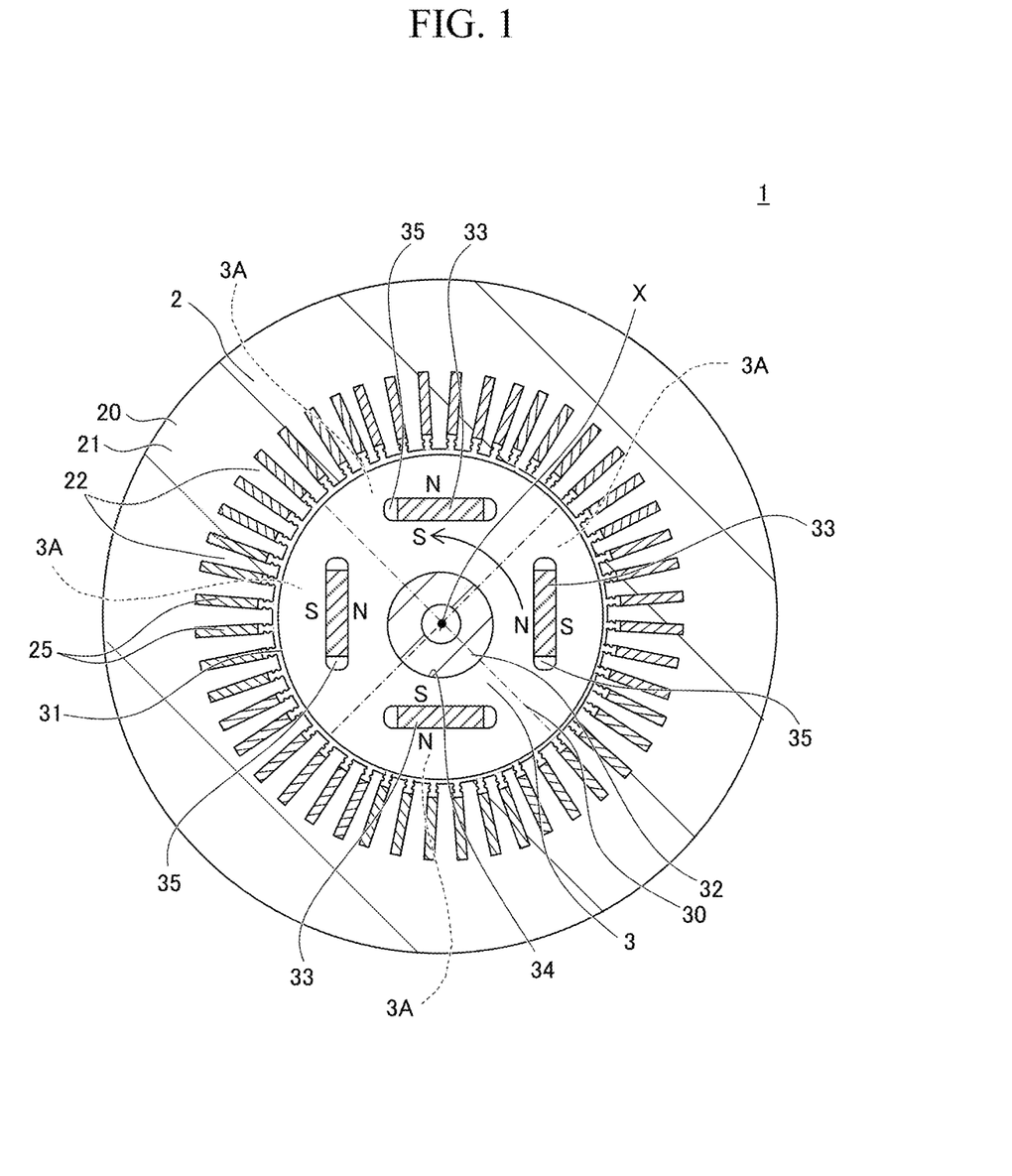
FIG. 1 is a cross-sectional view of a motor according to the present embodiment.
Figure 2A:
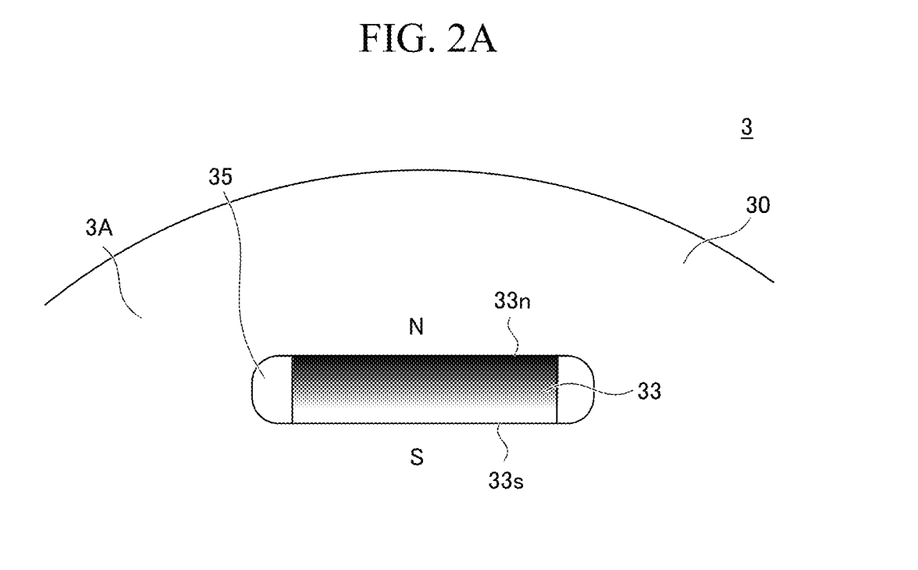
FIG. 2A is an enlarged cross-sectional view of a part of the rotor illustrated in FIG. 1.

In FIG. 1 and FIG. 2A, a motor 1 is an interior permanent magnet (IPM) motor including a cylindrical rotor 3 with permanent magnets 33 embedded in a rotor core 30, and a stator 2 positioned on the outer circumference of the rotor 3. The rotor 3 is disposed on the inner circumferential side of the stator 2 and faces the stator 2 with a distance in the radial direction, and is adapted to rotate relative to the stator 2. The motor 1 further includes, for example, a casing, a bearing, a bracket, a lead wire, and the like. However, the illustration and description of their configurations will be omitted since known configurations can be employed for their configurations.

The stator 2 includes a stator core 20 and a coil 25. The stator core 20 includes an annular yoke 21 and a plurality of teeth 22 extending inward in the radial direction from the yoke 21.

In the present embodiment, the stator core 20 may be a laminate obtained by stacking a plurality of foil members made of a nano-crystal soft magnetic material in the direction along a rotation axis X, a laminate obtained by stacking a plurality of electromagnetic steel sheets, or a powder magnetic core obtained by press-forming, for example, soft magnetic powder to which resin is added as a binder, as appropriate.

The coil 25 is formed by arranging the winding in the space between the plurality of teeth 22 by way of distributed winding or concentrated winding. When the coil 25 is energized, a rotating magnetic field for rotating the rotor 3 is generated.

The rotor 3 is adapted to rotate about the rotation axis X, and a rotary shaft 32 having the rotation axis X as the shaft center is fitted into the rotor core 30. The rotor 3 includes the cylindrical rotor core 30 provided with a shaft hole at its center, the rotary shaft 32 inserted into the shaft hole and fixed to the rotor core 30, and the plurality of permanent magnets 33 embedded in the rotor core 30. In the present embodiment, the rotor core 30 may be a laminate made of a soft magnetic material and obtained by stacking a plurality of electromagnetic steel sheets in the direction along the axis X of the rotor 3.

The rotor 3 has a plurality of magnetic poles 3A, 3A formed around the rotation axis X, with the permanent magnets 33 arranged therein, which will be described later. An even number of magnetic poles 3A are provided, and in the present embodiment, the rotor 3 has four fan-shaped magnetic poles 3A. In this case, the fan-shaped magnetic poles 3A each have a central angle of 90°.

As described above, the number of magnetic poles 3A is an even number, and the adjacent magnetic poles 3A, 3A constitute a magnetic pole pair. As long as such conditions are satisfied, the number of magnetic poles is not particularly limited. In the present embodiment, positions of the north pole and the south pole of the permanent magnet 33 in one magnetic pole 3A are inverted from those of the permanent magnet 33 in its adjacent magnetic pole 3A. Specifically, the rotor core 30 of the magnetic poles 3A is provided with slots 35. The slots 35 have the same position and size in the magnetic poles 3A. Each of the slots 35 has the permanent magnet 33 inserted thereinto such that the permanent magnets 33 in the adjacent magnetic poles 3A are magnetized in the opposite directions.

In the present embodiment, one permanent magnet 33 is provided in each magnetic pole 3A. However, the number of permanent magnets in each magnetic pole 3A is not particularly limited as long as the poles of the permanent magnet 33 in one magnetic pole 3A are inverted from the poles of the permanent magnet 33 in its adjacent magnetic pole 3A and then the permanent magnets 33 in the magnetic poles 3A are arranged in the same way. The motor 1 described above can utilize the reluctance torque in addition to the magnetic torque due to attraction/repulsion between the coil 25 and the permanent magnet 33.

In addition, the rotor core 30 is made of a soft magnetic material, examples of which include those with electromagnetic steel sheets laminated and those obtained by pressforming and then sintering soft magnetic powder. It should be noted that the electromagnetic steel sheets may be joined together with an insulating resin. Examples of the soft magnetic material forming the rotor core 30 include, but not limited to, those having at least one type of magnetic metal selected from a group consisting of Fe, Co, and Ni and at least one type of non-magnetic metal selected from a group consisting of B, C, P, Al, Si, Ti, V, Cr, Mn, Cu, Y, Zr, Nb, Mo, Hf, Ta, and W.

Examples as a representative material of the soft magnetic material include, but not limited to, a FeCo alloy (such as FeCo and FeCoV), FeNi alloy (such as FeNi, FeNiMo, FeNiCr, and FeNiSi), FeAl alloy or FeSi alloy (such as FeAl, FeAlSi, FeAlSiCr, FeAlSiTiRu, and FeAlO), FeTa alloy (such as FeTa, FeTaC, and FeTaN), and FeZr alloy (such as FeZrN).

An adhesive layer (not illustrated) of an insulating resin, for example, may be formed between the adjacent electromagnetic steel sheets of the rotor core 30. When the resin forming the adhesive layer is a thermosetting resin, the rotor core 30 may be obtained by stacking electromagnetic steel sheets, then immersing the laminate of the electromagnetic steel sheets in an uncured thermosetting resin, followed by raising the laminate for the curing of the thermosetting resin. Examples of the thermosetting resin include an epoxy resin, a polyimide resin, a polyamide imide resin, or an acrylic resin.

The rotor core 30 functions as a magnetic path of the magnetic flux contributing to the reluctance torque entering the permanent magnet 33 in the rotor core 30 from the side of the stator 2 and the magnetic flux contributing to the magnetic torque flowing out of the permanent magnet 33 toward the stator 2.

The rotary shaft 32 is inserted into the shaft hole of the rotor core 30 and fixed to the rotor core 30. The permanent magnet 33 is inserted into the slot 35 formed in the rotor core 30, and is fixed in the slot 35 by resin such as a thermosetting resin.

The permanent magnet 33 is disposed in the circumferential direction of the rotor core 30. The permanent magnet 33 may have any shape that is selected appropriately, such as a rectangular plate shape, a rectangular columnar shape, and the like. Examples of the permanent magnet 33 may include rare-earth magnets, such as a neodymium magnet containing neodymium, iron, and boron as the main components, and a samarium cobalt magnet containing samarium and cobalt as the main components. The permanent magnet 33 may be other magnets, such as a ferrite magnet and alnico magnet.

Figure 2B:
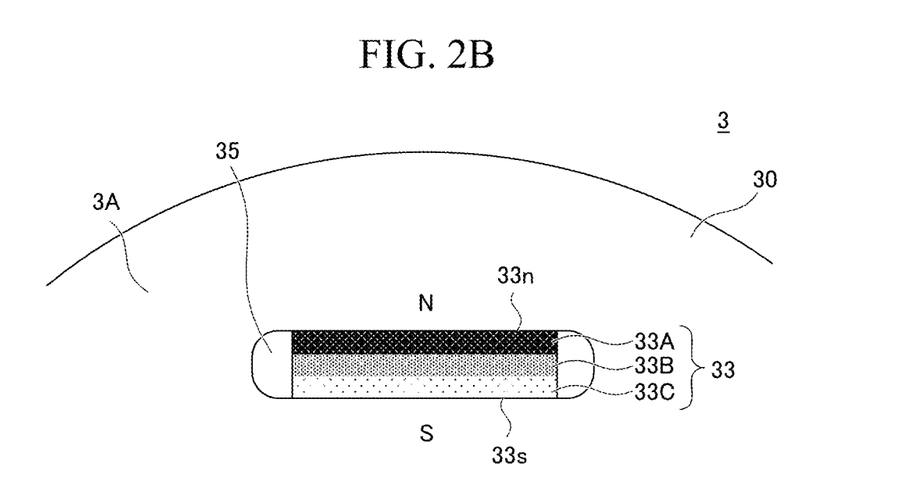
FIG. 2B is an enlarged cross-sectional view of a part of the rotor illustrated in FIG. 1.

In the present embodiment, as illustrated in FIG. 2A and FIG. 2B, the residual magnetization of the permanent magnet 33 decreases as it moves from the north pole toward the south pole in the thickness direction. Specifically, the residual magnetic flux density of the permanent magnet 33 close to the south pole is smaller than the residual magnetic flux density of the permanent magnet 33 close to the north pole. In addition, an outermost surface 33n of the permanent magnet 33 on the north pole has the largest residual magnetization in the permanent magnet 33, and an outermost surface 33s of the permanent magnet 33 on the south pole has the smallest residual magnetization in the permanent magnet 33.

In the present embodiment, as illustrated in FIG. 2A, the volume density of the permanent magnet 33 decreases as it moves from the north pole toward the south pole. Specifically, the permanent magnet 33 is a porous body, and the porosity of the permanent magnet 33 close to the north pole is higher than the porosity of the permanent magnet 33 close to the south pole.

Such a permanent magnet 33 is formed by the following steps: firstly filling magnetic powder obtained by crashing an alloy as the composition of the permanent magnet 33 into a female die of a forming die, then while heating the filled magnetic powder, forcing a male die of the forming die into the female die of the forming die. At this time, at a timing when the compressibility of the magnetic powder is high on the side contacting the male die, and the compressibility of the magnetic powder on its opposite side is low when forcing the male die, the forming of the body is completed. After that, the formed body is subjected to heat treatment, and the body after the heat treatment is magnetized such that the portion with a high compressibility is the north pole and the portion with a low compressibility is the south pole. These steps can produce the permanent magnet 33 as illustrated in FIG. 2A.

Furthermore, as illustrated in FIG. 2B, the permanent magnet 33 is obtained by stacking a plurality of magnetic layers 33A, 33B, 33C from the north pole to the south pole. In the present embodiment, the permanent magnet 33 includes three layers: the magnetic layers 33A, 33B, 33C. However, the number of layers of the permanent magnet 33 is not limited. In the present embodiment, the magnetic layer 33A (33B) close to the north pole has a larger residual magnetization than that of the magnetic layer 33B (33C) close to the south pole.

Herein, in the present embodiment, to set the residual magnetization of the magnetic layer 33A larger than the residual magnetization of the magnetic layer 33B, for example, a magnet piece having a composition with a relatively large residual magnetization, as the magnetic layer 33A, and a magnet piece having a composition with a relatively smaller residual magnetization than that of the aforementioned magnet piece, as the magnetic layer 33B, are stacked together. In the same manner, to set the residual magnetization of the magnetic layer 33B larger than the residual magnetization of the magnetic layer 33C, a magnet piece having a composition with a smaller residual magnetization than that of the magnet piece of the magnetic layer 33B, as the magnetic layer 33C, is further stacked. It should be noted that in stacking the magnet pieces, an adhesive or the like may be used to fix the magnet pieces together.

To produce the permanent magnet 33, for example, the magnetic layer 33A may be made of a neodymium magnet, the magnetic layer 33B may be made of a samarium cobalt magnet, and the magnetic layer 33C may be made of a ferrite magnet. Stacking different types of magnet pieces can produce the permanent magnet. The magnet pieces having a small residual magnetization are relatively easily available at low cost, for example. Thus, using the magnet pieces having a small residual magnetization can produce the permanent magnet 33 at lower cost as compared to the permanent magnet made of only the rare-earth magnet with a high residual magnetization.

In the present embodiment, to set the residual magnetization of the magnetic layer 33A larger than the residual magnetization of the magnetic layer 33B, for example, a magnet piece having a large volume density, as the magnetic layer 33A, and a magnet piece having a smaller volume density than that of the aforementioned magnet piece, as the magnetic layer 33B, may be stacked together. In the same manner, to set the residual magnetization of the magnetic layer 33B larger than the residual magnetization of the magnetic layer 33C, a magnet piece having a composition with a smaller volume density than that of the magnet piece of the magnetic layer 33B, as the magnetic layer 33C, is further stacked. In this manner, it is possible to reduce the volume density of the permanent magnet 33 in stages as it moves from the north pole toward the south pole. Herein, when the magnet amount used is equal to that in the past, the permanent magnet 33 has a larger thickness by the use of the magnet pieces having a small volume density. Thus, the permanent magnet 33 has a larger magnetic resistance according to an increase in its thickness. This can increase the torque of the motor 1.

According to the present embodiment, in the motor 1 with a rotor of an interior permanent magnet type, the torque of the motor 1 can be expressed by the sum of a magnetic torque and a reluctance torque. Herein, the magnetic torque is proportional to the amount of permanent magnets (materials) used in the rotor core 30, whereas the reluctance torque is proportional to the magnetic resistance of the permanent magnet 33.

In the present embodiment, as illustrated in FIG. 2A and FIG. 2B, the residual magnetization of each permanent magnet 33 decreases as it moves from the north pole toward the south pole. The magnetic flux of the permanent magnet 33 from the north pole is more likely to flow toward the stator 2 via the soft magnetic material of the rotor core 30. In addition, since the permanent magnet 33 can have a larger thickness than that of the existing permanent magnet when the magnet amount of the permanent magnet is approximately equal to that of the existing permanent magnet having a uniform residual magnetization, it is possible to increase the magnetic resistance. In view of the above, although the magnetic torque of the motor 1 decreases, the reluctance torque of the motor 1 increases.

In view of the above, even if the magnetic torque decreases by the use of a smaller amount of the permanent magnets 33 embedded in the existing rotor 3 (i.e., rotor core 30), it is possible to increase the reluctance torque. Thus, it is possible to suppress reduction of the torque of the motor 1. As a result, it is possible to reduce the material cost of the motor 1 while ensuring the performance of the motor 1. In addition, it is possible to increase the torque of the motor 1 as compared to the existing motor when the amount of permanent magnets used is equal to that in the past.

EXAMPLES

Hereinafter, examples of the present disclosure will be described, but the present disclosure is not limited to these examples.

Examples 1-1 to 1-3

As a modification of the analytical model illustrated in FIG. 1, a model of a rotor having six magnetic poles was prepared. Suppose that the permanent magnet in Examples 1-1 to 1-3 had a magnet thickness of 3.5 mm and was obtained by stacking three magnetic layers having different residual magnetizations such that the residual magnetization of the permanent magnet decreases as it moves from the north pole toward the south pole.

Relative density shown in Table 1 indicates a value when the volume density of the permanent magnet in Comparative Example 1-1 (described later) is 100% by volume. t1 magnetization ratio indicates a ratio of the magnetic flux density of the magnetic layer close to the north pole of the permanent magnet. t2 magnetization ratio indicates a ratio of the magnetic flux density of the magnetic layer in the center of the permanent magnet. t3 magnetization ratio indicates a ratio of the magnetic flux density of the magnetic layer close to the south pole of the permanent magnet. Therefore, the values decrease in the order: t1 magnetization ratio, t2 magnetization ratio, t3 magnetization ratio. The ratios of the magnetic flux density shown in Table 1 indicate values when the magnetic flux density of the permanent magnet in Comparative Example 1-1 (described later) is 1. Magnet amount ratio shown in Table 1 indicates a value when the magnet amount ratio of the permanent magnet in Comparative Example 1-1 (described later) is 100%.

Comparative Examples 1-1 to 1-3

As shown in Table 1, in Comparative Examples 1-1 to 1-3, the permanent magnets have the same residual magnetization, the t1 magnetization, the t2 magnetization, and the t3 magnetization of the magnets are also equal, but magnet thicknesses are different. Therefore, the magnet amount ratios vary depending on the magnet thickness.

Comparative Examples 2-1 to 2-3

As shown in Table 1, Comparative Examples 2-1 to 2-3 correspond to Examples 1-1 to 1-3, respectively, and are different from Examples 1-1 to 1-3 in that the permanent magnet was obtained by stacking three magnetic layers having different residual magnetizations such that the residual magnetization of the permanent magnet decreases as it moves from the south pole toward the north pole. Therefore, the values decrease in the order: t3 magnetization ratio, t2 magnetization ratio, t1 magnetization ratio.

TABLE 1

|  | Magnitude of residual magnetization (direction) | Magnet thickness [mm] | Relative density [% by volume] | t1 magnetization ratio | t2 magnetization ratio | t3 magnetization ratio | Magnet amount ratio [%] | Maximum torque ratio |
| --- | --- | --- | --- | --- | --- | --- | --- | --- |
| Example 1-1 | N→S | 3.5 | 96.4 | 1.000 | 0.964 | 0.929 | 96.4 | 0.986 |
| Example 1-2 | N→S | 3.5 | 89.3 | 1.000 | 0.893 | 0.786 | 89.3 | 0.958 |
| Example 1-3 | N→S | 3.5 | 82.1 | 1.000 | 0.821 | 0.643 | 82.1 | 0.929 |
| Comparative Example 1-1 | None | 3.5 | 100.0 |  | 1.000 |  | 100.0 | 1.000 |
| Comparative Example 1-2 | None | 2.4 | 100.0 |  | 1.000 |  | 68.6 | 0.867 |

TABLE 1-continued

| | Magnitude of residual magnetization (direction) | Magnet thickness [mm] | Relative density [% by volume] | t1 magnetization ratio | t2 magnetization ratio | t3 magnetization ratio | Magnet amount ratio [%] | Maximum torque ratio |
|---|---|---|---|---|---|---|---|---|
| Comparative Example 1-3 | None | 2.0 | 100.0 | | 1.000 | | 57.1 | 0.789 |
| Comparative Example 2-1 | S→N | 3.5 | 96.4 | 0.929 | 0.964 | 1.000 | 96.4 | 0.984 |
| Comparative Example 2-2 | S→N | 3.5 | 89.3 | 0.786 | 0.893 | 1.000 | 89.3 | 0.952 |
| Comparative Example 2-3 | S→N | 3.5 | 82.1 | 0.643 | 0.821 | 1.000 | 82.1 | 0.919 |

Figure 3:
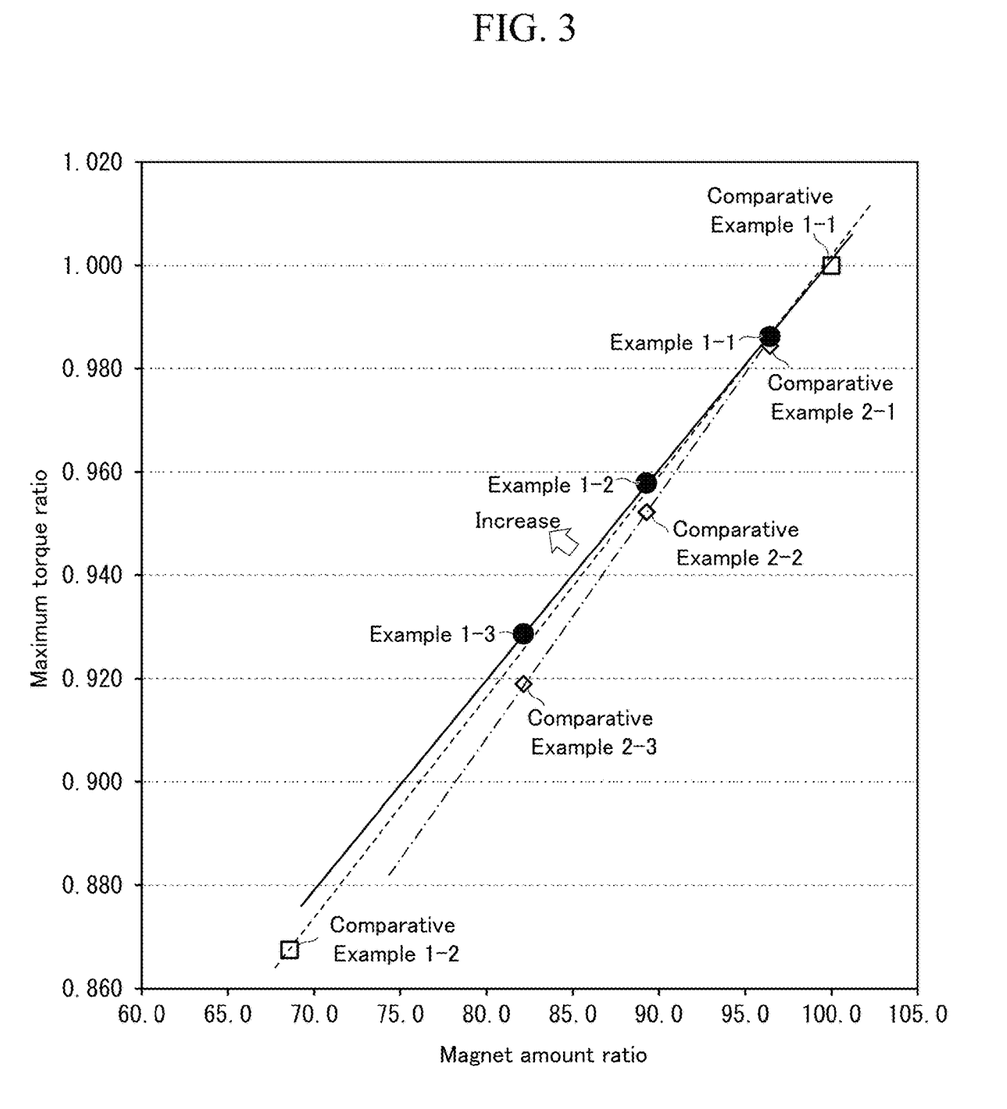
FIG. 3 is a graph showing the relation between the magnet amount ratio and the maximum torque ratio of the rotor in Examples 1-1 to 1-3 and Comparative Examples 1-1, 1-2, 2-1 to 2-3.

Analysis was made on the maximum torque of the motor in Examples 1-1 to 1-3 and Comparative Examples 1-1 to 2-3. The results are shown in Table 1 and FIG. 3. FIG. 3 is a graph showing the relation between the magnet amount ratio and the maximum torque ratio of the rotor in Examples 1-1 to 1-3 and Comparative Examples 1-1, 1-2, 2-1 to 2-3.

As illustrated in FIG. 3, the maximum torque of the motor tends to increase as the magnet amount ratio of the motor increases. However, with reference to the dashed line (i.e., estimate line) showing the relation between the magnet amount ratio and the maximum torque ratio estimated from Comparative Example 1-1, Comparative Example 1-2, the plots of Examples 1-1 to 1-3 are located above the dashed line (see ● and the solid line (i.e., estimate line) in the drawing), and the plots of Comparative Examples 2-1 to 2-3 are located below the dashed line (see ◇ and the dashed and single-dotted line (i.e., estimate line) in the drawing).

In view of the above results, when using the permanent magnet having a residual magnetization that decreases as it moves from the north pole toward the south pole as in Examples 1-1 to 1-3, the maximum torque of the motor increases even when substantially the same magnet amount is used.

Herein, torque Tt of the motor can be expressed by the sum of a magnetic torque Tm and a reluctance torque Tr according to the following equation (1):

$$Tt = Tm + Tr \qquad (1)$$

Furthermore, the magnetic torque Tm can be expressed by the following equation (2), where $P_n$ is the number of pole-pairs, $\Psi_a$ is an amount of magnetic flux, and $i_q$ is a q-axis current. That is, since the magnetic torque Tm depends on the amount of magnetic flux $\Psi_a$, an increase in the magnet amount may affect the magnetic torque Tm.

$$Tm = P_n \cdot \Psi_a \cdot i_q \qquad (2)$$

Meanwhile, the reluctance torque Tr can be expressed by the following equation (3), where $P_n$ is the number of pole-pairs, $L_d$ is a d-axis inductance, $L_q$ is a q-axis inductance, $i_d$ is a d-axis current, and $i_q$ is a q-axis current. Herein, the reluctance torque Tr depends on the difference between the d-axis inductance $L_d$ and the q-axis inductance $L_q$, and an increase in d-axis inductance $L_d$ and a decrease in q-axis inductance $L_q$ may increase the reluctance torque Tr.

$$Tr = P_n \cdot (L_d - L_q) \cdot i_d \cdot i_q \qquad (3)$$

In view of the above, a model of Examples 2-1 to 2-3, 3-1, 3-2 was further prepared, and a magnetic torque ratio Tm, a reluctance torque ratio Tr, a d-axis inductance $L_d$, and a q-axis inductance $L_q$ were calculated in Examples 1-1 to 3-2 and Comparative Examples 1-1 to 1-3. Details will be described below.

Examples 2-1 to 2-3

As shown in Table 2, in the same manner as in Examples 1-1 to 1-3, an analytical model was prepared. Examples 2-1 to 2-3 correspond to the above-described Examples 1-1 to 1-3, respectively, and are different from Examples 1-1 to 1-3 in that the thickness of the permanent magnet is different. In Examples 2-1 to 2-3, the relative density and the magnet amount ratio of the permanent magnet are smaller than those in their corresponding Examples 1-1 to 1-3 in proportion to a decrease in the magnet thickness.

Examples 3-1, 3-2

As shown in Table 2, in the same manner as in Examples 1-1 to 1-3, an analytical model was prepared. Examples 3-1, 3-2 correspond to the above-described Examples 1-1, 1-2, respectively, and are different from Examples 1-1, 1-2 in that the permanent magnet includes two magnetic layers: the magnetic layer close to the north pole and the magnetic layer in the center in Examples 1-1, 1-2. The magnet amount ratio of the permanent magnet is smaller than that in Examples 3-1, 3-2 in proportion to a decrease in the magnet thickness.

TABLE 2

| Case | Magnitude of residual magnetization (direction) | Magnet thickness [mm] | Relative density [% by volume] | t1 magnetization [T] | t2 magnetization [T] | t3 magnetization [T] | Magnet amount ratio [%] |
|---|---|---|---|---|---|---|---|
| Example 2-1 | N→S | 2.4 | 96.4 | 1.000 | 0.964 | 0.929 | 66.1 |
| Example 2-2 | N→S | 2.4 | 89.3 | 1.000 | 0.893 | 0.786 | 61.2 |
| Example 2-3 | N→S | 2.4 | 82.1 | 1.000 | 0.821 | 0.643 | 56.3 |
| Example 3-1 | N→S | 2.0 | 96.4 | 1.000 | 0.929 | — | 55.1 |
| Example 3-2 | N→S | 2.0 | 89.3 | 1.000 | 0.786 | — | 51.0 |

Figure 4:
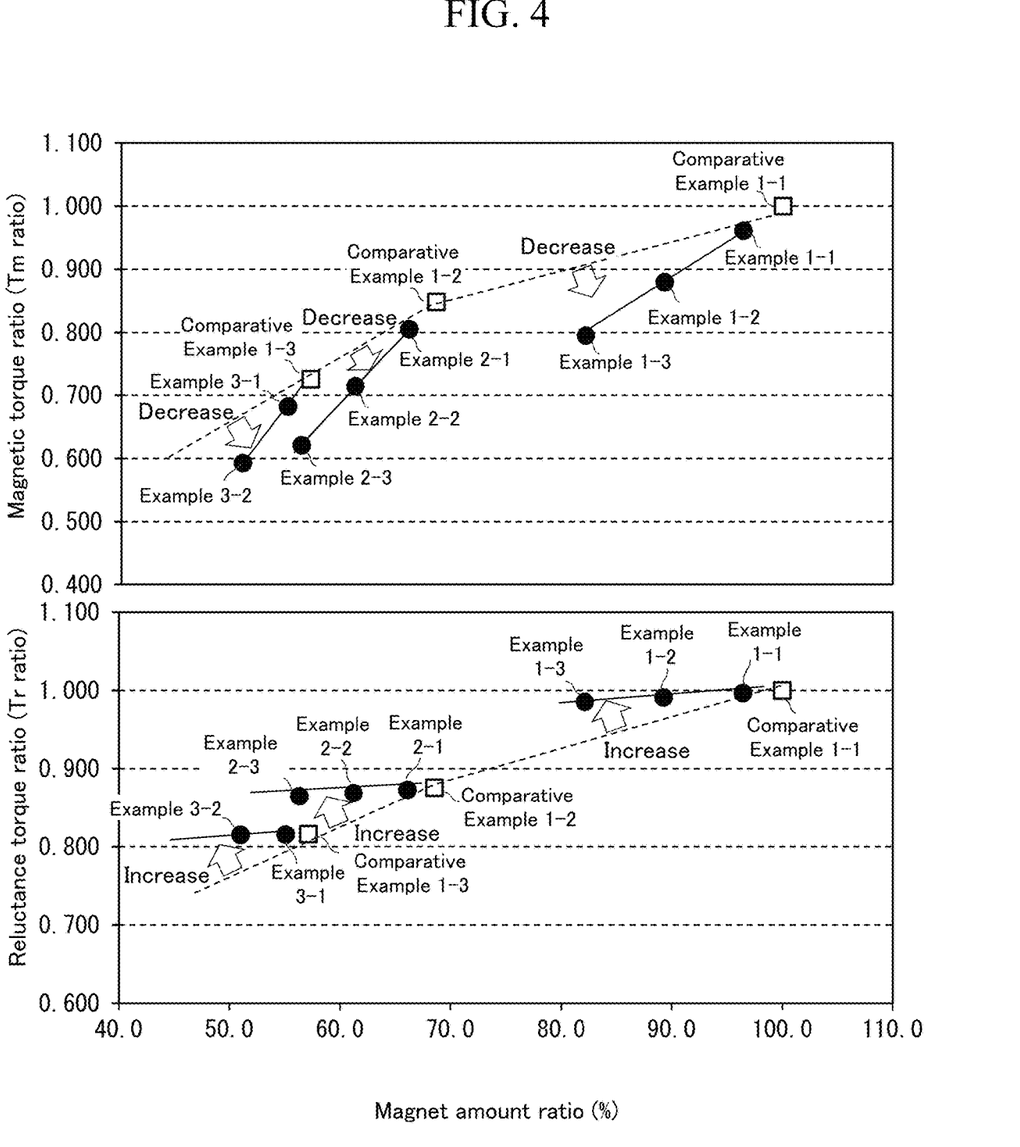
FIG. 4 illustrates graphs showing the relation between the magnet amount ratio and the magnetic torque ratio and the relation between the magnet amount ratio and the reluctance torque ratio of the rotor in Examples 1-1 to 3-2 and Comparative Examples 1-1 to 1-3.
Figure 5:
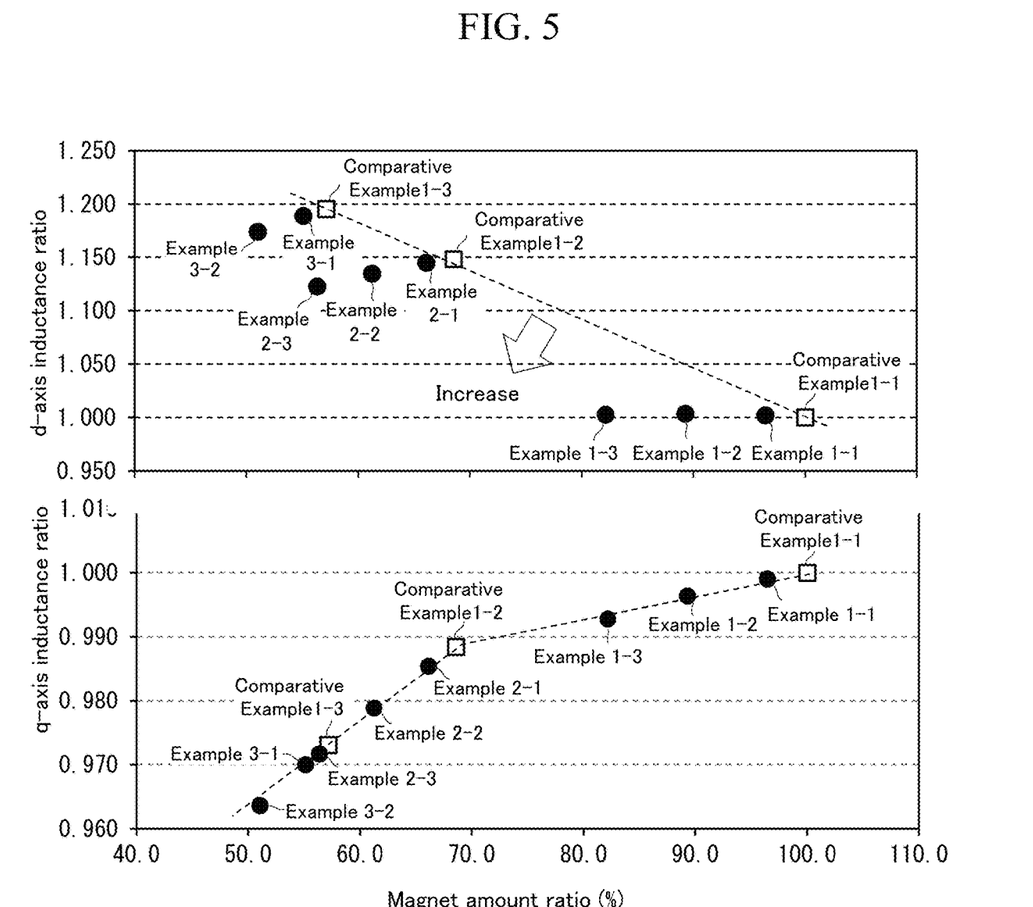
FIG. 5 illustrates graphs showing the relation between the magnet amount ratio and the d-axis inductance ratio Ld and the relation between the magnet amount ratio and the q-axis inductance ratio Lq of the rotor in Examples 1-1 to 3-2 and Comparative Examples 1-1 to 1-3.

A magnetic torque ratio (Tm ratio), a reluctance torque ratio (Tr ratio), a d-axis inductance ratio (Ld ratio), and a q-axis inductance ratio (Lq ratio) in Examples 1-1 to 3-2, and Comparative Examples 1-1 to 1-3 were calculated. These ratios indicate values when the result of Comparative Example 1-1 is 1. The results are illustrated in FIG. 4 and FIG. 5. FIG. 4 illustrates graphs showing the relation between the magnet amount ratio and the magnetic torque ratio and the relation between the magnet amount ratio and the reluctance torque ratio of the rotor in Examples 1-1 to 3-2 and Comparative Examples 1-1 to 1-3. FIG. 5 illustrates graphs showing the relation between the magnet amount ratio and the d-axis inductance ratio and the relation between the magnet amount ratio and the q-axis inductance ratio of the rotor in Examples 1-1 to 3-2 and Comparative Examples 1-1 to 1-3.

TABLE 3

| Case | Magnitude of residual magnetization (direction) | Magnet amount ratio [%] | Maximum torque ratio | Tm ratio | Tr ratio | Ld ratio | Lq ratio |
|---|---|---|---|---|---|---|---|
| Example 1-1 | N→S | 96.4 | 0.986 | 0.961 | 0.997 | 1.002 | 0.999 |
| Example 1-2 | N→S | 89.3 | 0.958 | 0.880 | 0.991 | 1.003 | 0.996 |
| Example 1-3 | N→S | 82.1 | 0.929 | 0.795 | 0.986 | 1.003 | 0.993 |
| Example 2-1 | N→S | 66.1 | 0.853 | 0.805 | 0.873 | 1.145 | 0.985 |
| Example 2-2 | N→S | 61.2 | 0.823 | 0.714 | 0.869 | 1.134 | 0.979 |
| Example 2-3 | N→S | 56.3 | 0.792 | 0.621 | 0.865 | 1.123 | 0.972 |
| Example 3-1 | N→S | 55.1 | 0.775 | 0.682 | 0.815 | 1.189 | 0.970 |
| Example 3-2 | N→S | 51.0 | 0.748 | 0.593 | 0.815 | 1.174 | 0.964 |
| Comparative Example 1-1 | None | 100.0 | 1.000 | 1.000 | 1.000 | 1.000 | 1.000 |
| Comparative Example 1-2 | None | 68.6 | 0.867 | 0.848 | 0.876 | 1.148 | 0.988 |
| Comparative Example 1-3 | None | 57.1 | 0.789 | 0.726 | 0.816 | 1.195 | 0.973 |

As described in FIG. 4 and the equation (2), the magnetic torque ratio (Tm ratio) of the motor tends to increase as the magnet amount ratio of the motor increases. Herein, with reference to the estimate lines (i.e., the solid lines in the drawing) estimated from Examples 1-1 to 1-3, 2-1 to 2-3, 3-1, 3-2 shown in the upper graph of FIG. 4, the magnetic torque ratio is smaller for the same magnet amount as compared to the estimate line (i.e., the dashed line in the drawing) estimated from Comparative Examples 1-1 to 1-3.

However, with reference to the estimate lines (i.e., the solid lines in the drawing) estimated from Examples 1-1 to 1-3, 2-1 to 2-3, 3-1, 3-2 shown in the lower graph of FIG. 4, the reluctance torque ratio is larger for the same magnet amount as compared to the estimate line (i.e., the dashed line in the drawing) estimated from Comparative Examples 1-1 to 1-3.

In view of the foregoing and the results shown in FIG. 3, it is assumed that when using the permanent magnet having a residual magnetization that decreases in stages as it moves from the north pole toward the south pole, the reluctance torque increases even if the magnetic torque decreases, and thus, the torque of the motor increased.

Furthermore, analysis will be made in more detail. With reference to the graphs of FIG. 5, in Examples 1-1 to 1-3, 2-1 to 2-3, 3-1, 3-2, the d-axis inductance ratio is smaller as compared to the estimate line (i.e., the dashed line in the drawing) estimated from Comparative Examples 1-1 to 1-3, but the q-axis inductance ratio is substantially equal. When using the permanent magnet having a residual magnetization that decreases in stages as it moves from the north pole toward the south pole, the q-axis inductance is maintained. Thus, it can be said that it is possible to reduce the d-axis inductance and to increase only the magnetic resistance without blocking the magnetic circuit having a soft magnetism that is effective for the reluctance torque. It is assumed that this is because when the same magnet amount of permanent magnets is used, the magnets in Examples have a larger magnet thickness as compared to the magnets in Comparative Examples, and thus have increased magnetic properties. In view of such results, it can be said that even when the magnet amount is equal, using the permanent magnet having a residual magnetization that decreases as it moves from the north pole toward the south pole can increase the torque of the motor as compared to the permanent magnet having a uniform residual magnetization.

In addition, the inventors formed the permanent magnet by the following steps: firstly filling magnetic powder obtained by crashing an alloy as the composition of the permanent magnet into a female die of a forming die, then while heating the filled magnetic powder, forcing a male die of the forming die into the female die of the forming die. At this time, at a timing when the compressibility of the magnetic powder is high on the side contacting the male die, and the compressibility of the magnetic powder on its opposite side is low when forcing the male die, the forming of the body is completed. After that, the formed body is subjected to heat treatment, and the body after the heat treatment is magnetized such that the portion with a high compressibility is the north pole and the portion with a low compressibility is the south pole.

Figure 6:
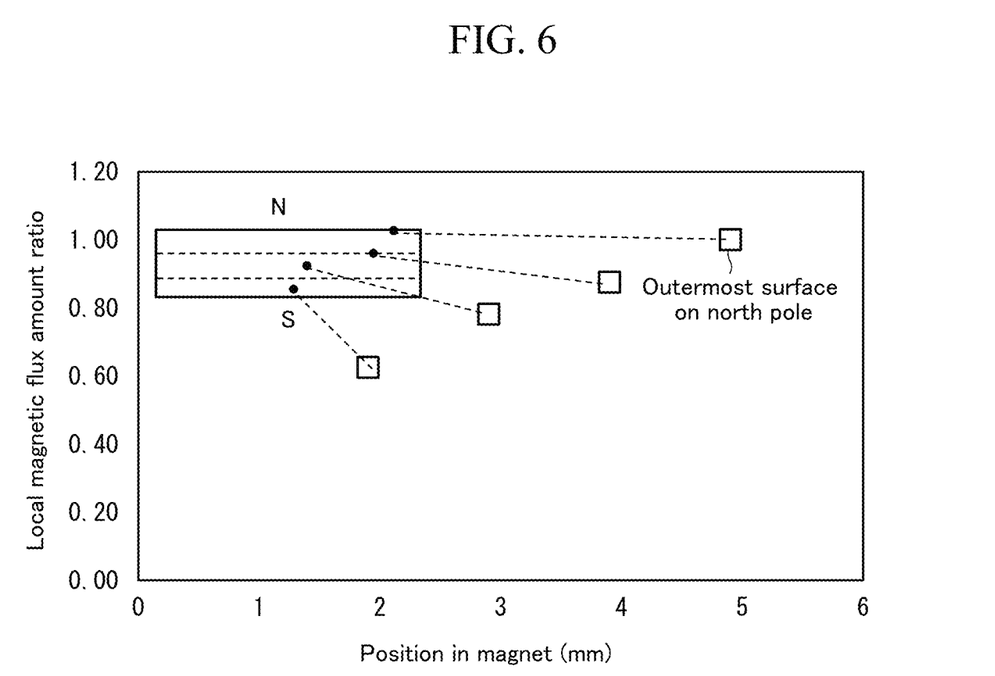
FIG. 6 is a graph showing a local magnetic flux amount ratio in the magnet having a residual magnetization that is inclined in the thickness direction.
Figure 7:
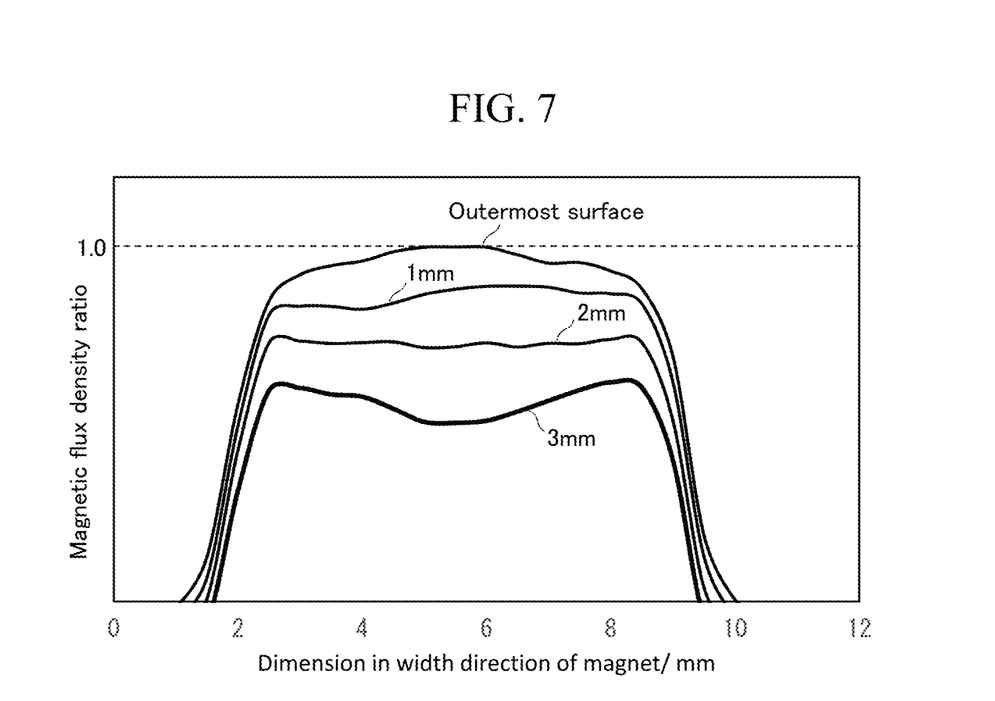
FIG. 7 is a graph obtained by measuring the magnetic flux density in the width direction of the magnet while cutting out in the thickness direction the magnet having a residual magnetization that is inclined in the thickness direction.

The magnetic flux of the outermost surface close to the north pole in the obtained permanent magnet was measured while cutting out the permanent magnet to reduce its thickness by 1 mm to reach 3 mm, whereby the magnetic flux of the surface was measured from the north pole side by using a flux meter. The results are shown in FIG. 6 and FIG. 7. FIG. 6 is a graph showing a local magnetic flux amount ratio in the magnet having a residual magnetization that is inclined in the thickness direction. FIG. 7 is a graph obtained by measuring the magnetic flux density in the width direction of the magnet while cutting out in the thickness direction the magnet having a residual magnetization that is inclined in the thickness direction.

As is clearly seen from FIG. 6, the residual magnetization decreases with inclination from the north pole toward the south pole, and it is assumed that the residual magnetization (i.e., magnetic flux density) can be changed to about 60% at maximum. Therefore, in view of the relation between t1 magnetization ratio and t3 magnetization ratio in Table 1 shown above and this measurement result, suppose that the residual magnetization (i.e., magnetic flux density) of the surface in the north pole is 1, it can be said that the residual magnetization (i.e., magnetic flux density) close to the south pole may be within the range of 0.60 to 0.93, or may be within the range of 0.60 to 0.79 In addition, as illustrated in FIG. 7, it is found that, also in the width direction of the magnet, the residual magnetization decreases with inclination from the north pole toward the south pole.

The embodiment of the present disclosure has been described in detail, but the present disclosure is not limited to the above embodiment, and various design changes may be made thereto without departing the spirit of the present disclosure described in the scope of the claims.

What is claimed is:

1. A motor comprising:
    a rotor with a plurality of permanent magnets embedded in a rotor core; and
    a stator positioned on an outer circumference of the rotor, wherein:
    the rotor includes a plurality of magnetic poles formed around a rotation axis of the rotor, the magnetic poles having the permanent magnets arranged therein,
    the permanent magnets in adjacent magnetic poles are arranged such that positions of a north pole and a south pole of the permanent magnet in one magnetic pole are inverted from those of the permanent magnet in a magnetic pole adjacent to the one magnetic pole, and
    the permanent magnets each have a residual magnetization that decreases as it moves from the north pole toward the south pole.

2. The motor according to claim 1, wherein a volume density of the permanent magnet decreases as it moves from the north pole toward the south pole.

3. The motor according to claim 1, wherein the permanent magnet is obtained by stacking a plurality of magnetic layers from the north pole to the south pole, and the magnetic layer close to the north pole has a larger residual magnetization than that of the magnetic layer close to the south pole.

4. The motor according to claim 3, wherein in the permanent magnet, a volume density the magnetic layer close to the north pole is larger than a volume density of the magnetic layer close to the south pole.

* * * * *